Figure 4:
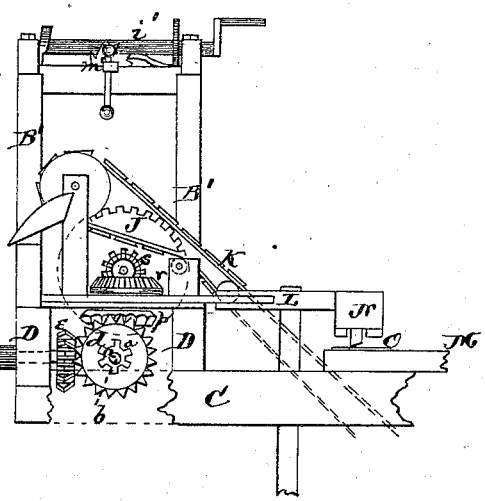

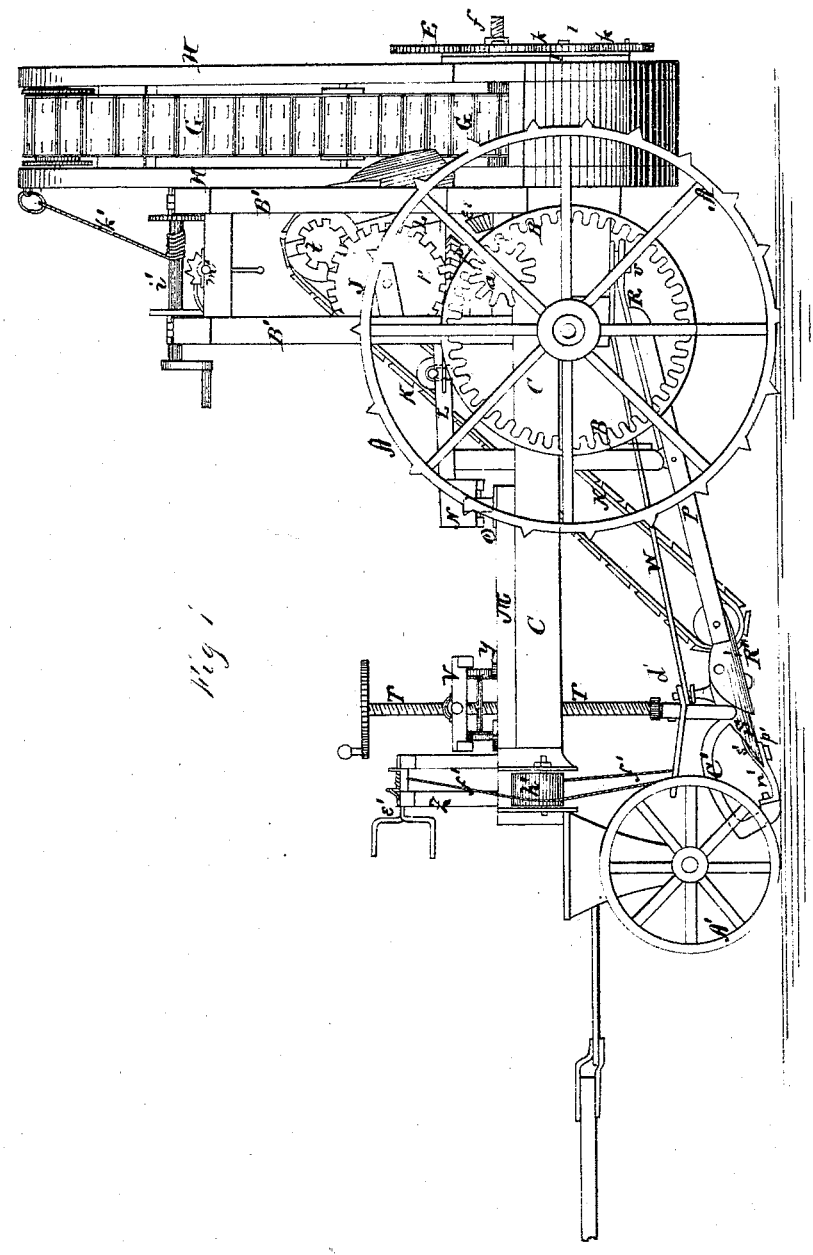

3 Sheets--Sheet 2.
J. T. HAM.
Excavators.
No. 135,475.  Patented Feb. 4, 1873.
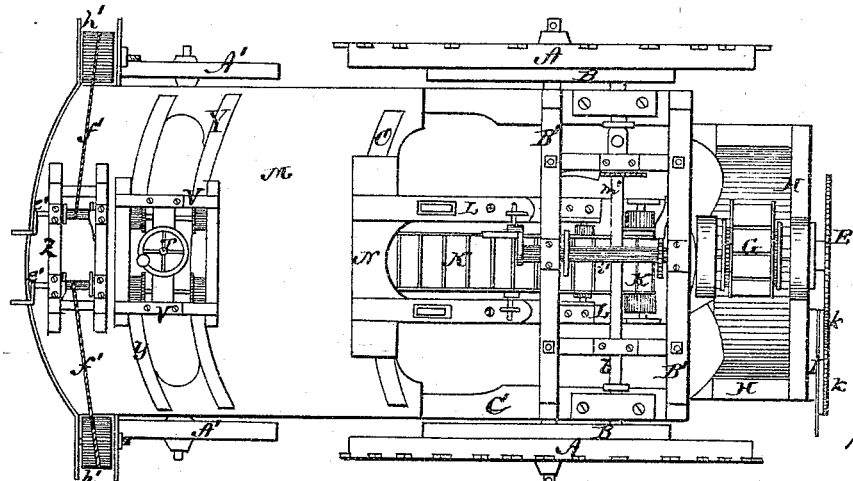
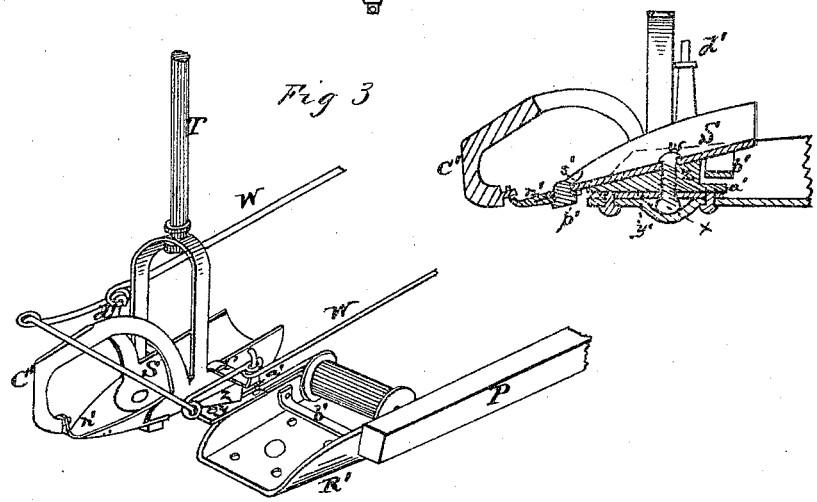
Witness:
Franck L. Ourand
C. L. Evert
Inventor.
J. T. Ham
per
Alexander Mason
Attorneys.

3 Sheets--Sheet 3.

J. T. HAM.
Excavators.

No. 135,475.　　　　　　　　　　　　　Patented Feb. 4, 1873.

Witness:
Franck L. Durand
C. L. Evert.

Inventor.
J. T. Ham
per
Alexander Mason
Attorneys.

UNITED STATES PATENT OFFICE.

JOEL T. HAM, OF LIBERTY, INDIANA.

IMPROVEMENT IN EXCAVATORS.

Specification forming part of Letters Patent No. 135,475, dated February 4, 1873.

*To all whom it may concern:*

Be it known that I, JOEL T. HAM, of Liberty, in the county of Union and in the State of Indiana, have invented certain new and useful Improvements in Excavators; and do hereby declare that the following is a full, clear, and exact description thereof, reference being had to the accompanying drawing and to the letters of reference marked thereon making a part of this specification.

My excavator is designed for building embankments, taking out cuts or levees, or any other purpose for which such a machine can be used. The nature of my invention consists, first, in driving or shoving the scoop-shaped plow from a center pin in the rear instead of drawing it from the front; second, in securing the scoop on a pivot with ball-joint or its equivalent; third, in parallel rods and standards attached to the scoop for holding the same in proper position; fourth, in a frame and crank and shafting by which the lateral motion is given to the scoop, and the same firmly held on whatever angle it may be cutting; fifth, in the arrangement by which the frame and shafting that drives the forward apron and the gearing is held in position and worked on any angle, and is geared to and driven by the gearing on a vertical shaft, and the connections formed by which lateral motion is given to it; sixth, in a tube for the purpose of supporting the frame-work that carries the overhanging apron, and for the purpose of working the shaft through it that drives the overhanging apron, and for holding the journal-box in which the shaft runs, and for holding the adjusting-cam; seventh, in the overhanging apron and the frame that supports it for the purpose of elevating the dirt and delivering it at right angles to the carriage, the said frame and apron being reversible from right to left, and working equally well either side up; eighth, in an adjustable bar hung on a center and carrying two pinions, by which the act of turning the frame and apron over from right to left changes the pinions that connect the spur-gear that works on the shaft in the tube with the pinion on the shaft that drives the overhanging apron by the cam on the tube, so as to cause the apron to run from the center out on either side; ninth, in the arrangement of a frame and crank for the purpose of raising and lowering the overhanging apron, and also in a shaft and ratchet that hold the frame and apron on it in a vertical position when traveling on the road; tenth, in a movable point of the scoop and the manner of attaching it to the same; eleventh, in a curved or sleigh-runner-shaped colter, and the manner of fastening the same, for the purpose of preventing the scoop from getting fast by causing it to jump over roots or stones or other obstructions.

In order to enable others skilled in the art to which my invention appertains to make and use the same, I will now proceed to describe its construction and operation, referring to the annexed drawing, in which—

Figure 5:
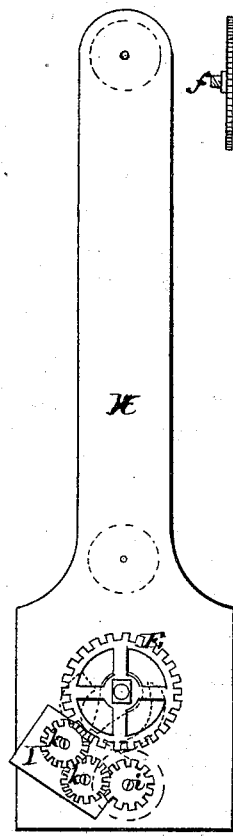
Figure 6:
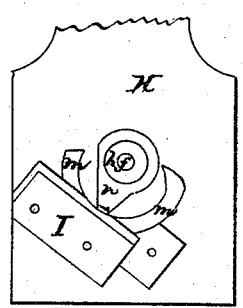

Figure 1 is a side elevation, and Fig. 2 a plan view, of my entire machine. Fig. 3 is a perspective view of enlarged dimensions of the scoop with its attachments. Fig. 4 is a section, showing the rear or upper end of the central apron with the gearing connected with the same. Fig. 5 is a rear view of the frame carrying the overhanging apron. Fig. 6 is a view of the adjustable plate and cam for reversing the movement of the overhanging apron. Fig. 7 is an enlarged longitudinal section of the scoop with its attachments.

My machine is intended to be drawn by from four to six horses or oxen, and when in operation it is driven along on either side of the proposed embankment or levee, and the scoop-shaped plow is let down, and what it cuts is taken up by the apron and deposited on the embankment, or when taking out cuts it is driven through the center and the dirt thrown out on one or both sides. This machine is supported upon four wheels, the principal weight being upon the two hind wheels A A, on each of which is a cog-gear wheel B driving pinions $a$ on each end of a horizontal shaft, $b$, which lies crosswise of the carriage, and is held in position by journal-boxes bolted to timbers C C. These timbers are framed into timbers D, three by twenty inches, one set edgewise on the axle, and another is placed thirteen inches back, which is held in position by the ends of the side pieces of the carriage and by bolts. These timbers form a kind of box, and the horizontal shaft $b$ is placed on timbers framed across the bottom of this box.

The shafting $b$, in a full-sized machine, is made in three sections, coupled by ratchet-couplings, so that they will slip over when either wheel is turned back, or can be thrown out of gear when the machine is traveling on the road. On the middle section of this shaft is a miter-wheel, $d$, eight inches in diameter, which gears into another miter-wheel, $e$, of the same size, upon a horizontal shaft, $f$, and this shaft projects back at right angles to the shaft $b$, and works through the back timber of the box and through a tube, $h$, bolted to this timber. On the outer end of the shaft $f$ is a wheel E with spur-gear, which drives the pinion $i$ that runs the overhanging apron G. This apron works at right angles to the carriage, and is supported by a frame-work, H, which is slipped onto the tube $h$, through which the shaft $f$ works. This tube $h$ is the support and riding place for the frame H that carries the overhanging apron G, and it also is the center on which said frame turns when changing the apron from right to left. The apron G is constructed of wood or iron, on two endless chains, and is driven from a shaft placed crosswise of the lower end of the frame by two spur-wheels that work into the links of the chains. On the outer end of this shaft is the pinion $i$, which gears into and is worked by two other pinions, $k\ k$, worked on studs on an adjustable bar, I. This bar is provided with two curved arms, $m\ m$, and is adjusted by a stationary cam, $n$, fastened to the outer end of the tube $h$.

By this arrangement, in the act of turning the frame H and apron from right to left, the gears $k\ k$, that connect the spur-gear E on the horizontal shaft $f$ in the tube $h$ with the pinion $i$ that drives the overhanging apron, are changed, which causes the apron to run from the center out on either side. The outer end of the apron G may be elevated from seven to fifteen feet, according to the length of the apron used. The side timbers of the carriage are three by twelve inches, and fourteen feet long, the forward end of the same being fastened to the bolster that works on the axle of the forward wheels A′ A′. The top of the box at the back end of the carriage is, in a full-sized machine, decked over with two-inch plank, two feet wide, placed in the center of the top of the box. Through the center of this plank passes a vertical shaft having a miter-wheel, $p$, below said plank, which miter-wheel gears with and is turned by the miter-wheel $d$ on the shaft $b$. This vertical shaft extends a little above the deck, and is held in a journal-box, and on the upper end of the shaft is a miter-gear, $r$, that drives a similar wheel, $s$, on a short horizontal shaft running above and parallel with the shaft $b$. On the outer end of this short shaft is a spur-gear, J, that drives a pinion, $t$, on the shaft that supports the upper end of and runs another apron, K. The frame L that supports this shafting, gearing, and apron is held in position by a center-bar on a collar attached to the journal-box above mentioned, between the deck and the miter-wheel $s$. The bed-timbers of the frame L extend forward on top of the deck M that lies crosswise on the side pieces of the carriage, and are attached to a two-wheel truck, N, which runs on a single-track curved tram-way, O, crosswise of the deck M. These bed-timbers are connected to a movable frame, P, below, by which lateral motion is given to the truck and bed-timbers with the frame, shafting, apron, and gearing upon them. The movable timbers P below are coupled by a forked iron, R, which is attached to a center-pin, $v$, on the under side of the box of the back part of the carriage exactly under the vertical shaft to which the pinions $p\ r$ are attached, said timbers extending forward nine feet, and are coupled by another iron, R′, similar to the coupling at the back end. To this forward iron R′ the scoop-shaped plow S is attached by a center-pin, $w$, that works with a ball-joint on the iron R′ below a horizontal seat, $y'$, on which it is firmly held, and is still adjustable as on a pivot. To the under side of the scoop S is bolted a wedge-shaped piece, $z$, the upper side of which has the same pitch as the scoop, and the under side is shaped to fit the horizontal seat $y'$. The upper end of the center-pin $w$ is screwed tightly into a hole through this wedge-shaped piece $z$ and the bottom of the scoop. The other end of this pin has the ball-shaped head $f$ that works in the socket in the iron R′ below the horizontal seat $y'$. On the scoop at the back end is a lip, $a'$, bolted to the bottom of the scoop which laps under a curved bar, $b'$, attached to the frame P crosswise, which holds the back end of the scoop down, but allows it a lateral motion. On the movable frame P, close behind the scoop, is a shaft with pulleys, on which the forward end of the apron K is supported and worked, and the dirt cut by the scoop is carried up and dumped over the upper end onto the other apron G. The forward end of the movable frame P, together with the scoop, pulley, and apron, is suspended by a screw, T, or rack and pinion, by which it is raised or lowered. The upper end of this screw or rack and pinion is attached to a four-wheel truck, V, that runs on a curved tram-way, Y, crosswise of the deck M of the carriage. On each side of the scoop S is a standard, $d'$, placed the same distance from the back center-pin $v$ that the center-pin $w$ in the scoop is placed. These standards are as high as the scoop is long, measuring from the center-pin to the point of the scoop, and to the top of said standards are attached parallel rods W W, one on each side. These rods extend back and are attached to the under part of the frame of the machine at the back end on each side of the center-pin $v$, and the same distance apart that the front ends are on the standards. The parallel rods W W are so called because they hold the scoop straight and parallel to the center line of the carriage on whatever angle the scoop may be cutting. On the deck M of the carriage, near the tram-way Y, is a frame, Z, on which are placed two crank-shafts, $e'\ e'$, with suitable ratchets, and with chains or ropes $f'\ f'$ attached and worked over pulleys $h'\ h'$ at the sides of the carriage, the ends of said chains or ropes being connected with the scoop. By turning the crank the scoop is swung to any required angle in the width of the carriage, and is held when cutting by the ratchets and by the parallel rods which hold the scoop tight and make it cut parallel to the center line of the carriage. The forward apron K, as also the overhanging apron G, runs between side boards to keep the dirt from falling off. On the back part of the carriage is a frame, B', four feet high, and on the top of the same is a crank-shaft, $i'$, with a spool and ratchet, to which is attached a rope, $k'$, fastened to the outer end of the frame H that carries the overhanging apron. By turning this crank the frame H is raised up to a vertical position and lowered down on the other side, if desired; but when traveling on the road it is held in a vertical position by ropes that are tightened by ratchet and shaft $m'$ for that purpose. The forward wheels A' A' of this machine are the same as for an ordinary wagon. These wheels stand out ahead of the scoop so that they can be turned and clear the scoop so as to allow it to swing out and make a cut wide enough for the hind wheels A A to run in the furrow on either side, thus making a cut wide enough, which allows the machine to work down into the cut. The aprons are supported in the middle, to hold them in line when loaded with dirt, by carrying-rollers. On the scoop it is necessary to have a movable point, $n'$, and to have a number of them, so as to always have a sharp one to put on when needed. The forward point of the scoop proper is cut in a slight curve, the sides raised a little, and the point beveled on the top. The movable point $n'$ is beveled and made to fit and held in place by a bar, $p'$, of iron, welded to its under side. This bar extends back on the under side of the scoop, and is bolted to it. On the upper surface, at the back part of the point $n'$, are lips $s'$, which are also welded to the upper surface of the point and lap over on the top of the scoop, and extend back two inches, rounded and tapered off smoothly, so that the dirt will slip over easily. Thus it is easily taken off, and, when put on, firmly held in position. C' represents the colter, which in some localities may be dispensed with, but in rooty or stony ground it must be used to avoid getting the scoop fast. The colter C' may be fastened to the movable point of the scoop by having said point turned up, with a hole in it, and a nib on the heel of the colter, as shown in Fig. 3, to fit in the hole; or a hole may be made in the heel of the colter and the point of the scoop fitted to it. Either way of fastening will assist in holding the point of the scoop in position, as the top of the colter is forked, and each fork bends back and is bolted to the sides of the back part of the scoop.

Having thus fully described my invention, what I claim as new, and desire to secure by Letters Patent, is—

1. In an excavator, the arrangement of the frame P, to which the scoop-shaped plow S is attached, on a rear center-pin, $v$, so that the plow may be driven from the rear, substantially as herein set forth.

2. The pivot $w$ with ball-joint for securing the scoop to its support, substantially as herein set forth.

3. The parallel rods W W and the standards $d'\ d'$ to which they are attached, constructed and arranged substantially as and for the purposes herein set forth.

4. The arrangement of the frame Z, crank-shafts $e'$, ropes or chains $f'$, and pulleys $h'$, substantially as and for the purposes herein set forth.

5. The combination of the frame L with the gearing upon it for driving the forward apron K, pivoted as described, and the truck N moving upon the tram-way O, all substantially as and for the purposes herein set forth.

6. The tube $h$, arranged as described, for supporting the swinging frame H for forming a bearing for the shaft $f$, and for holding the adjusting-cam $n$, substantially as herein set forth.

7. The overhanging apron G and the reversible frame H that supports it for the purpose of elevating the dirt and delivering the same at right angles to and at either side of the carriage, substantially as herein set forth.

8. The combination of the adjustable bar I with arms $m\ m$ and pinions $k\ k$ and the stationary cam $n$, constructed and arranged substantially as and for the purposes herein set forth.

9. The frame B', with shafts $i'$ and $m'$, having suitable ratchets and ropes connecting with the overhanging apron-frame, substantially as and for the purposes herein set forth.

10. The movable point $n'$, constructed as described and provided with bar $p'$ and wings $s'$, substantially as and for the purposes herein set forth.

11. The curved colter C', forked at its upper or rear end and its front or lower end attached to the removable point $n'$, substantially in the manner and for the purposes herein set forth.

In testimony that I claim the foregoing I have hereunto set my hand this 14th day of November, 1872.

J. T. HAM.

Witnesses:
Z. CASTERLINE,
W. M. CASTERLINE.